(12) United States Patent
Nakata

(10) Patent No.: US 8,983,847 B2
(45) Date of Patent: Mar. 17, 2015

(54) VOICE RECOGNITION APPARATUS, METHOD, AND COMPUTER PROGRAM PRODUCT

(75) Inventor: Kouta Nakata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 13/535,798

(22) Filed: Jun. 28, 2012

(65) Prior Publication Data

US 2013/0080156 A1     Mar. 28, 2013

(30) Foreign Application Priority Data

Sep. 22, 2011  (JP) ................................. 2011-207038

(51) Int. Cl.
| | | |
|---|---|---|
| *G10L 21/00* | (2013.01) | |
| *G10L 19/00* | (2013.01) | |
| *H04N 21/422* | (2011.01) | |
| *H04N 21/45* | (2011.01) | |
| *H04N 21/466* | (2011.01) | |
| *H04N 21/472* | (2011.01) | |
| *H04N 21/475* | (2011.01) | |
| *H04N 21/84* | (2011.01) | |

(52) U.S. Cl.
CPC ......... *H04N 21/42203* (2013.01); *H04N 21/45* (2013.01); *H04N 21/466* (2013.01); *H04N 21/4668* (2013.01); *H04N 21/47214* (2013.01); *H04N 21/4755* (2013.01); *H04N 21/84* (2013.01)
USPC .......................................... 704/275; 704/230

(58) Field of Classification Search
CPC .... G10L 15/1815; G10L 15/183; G10L 15/00
USPC .................................. 704/230–257, 270–278
See application file for complete search history.

(56) References Cited

U.S. PATENT DOCUMENTS 6,314,398 B1 * 11/2001 Junqua et al. ................. 704/257
8,175,885 B2 *  5/2012 Sureka et al. ............. 704/270.1
(Continued)

FOREIGN PATENT DOCUMENTS

| JP | 2000-250575 | 9/2000 |
|---|---|---|
| JP | 2001-282285 | 10/2001 |

(Continued)

OTHER PUBLICATIONS

Office Action for Japanese Patent Application No. 2011-207038 Dated Apr. 30, 2014, 3 pgs.

*Primary Examiner* — Samuel G Neway

(74) *Attorney, Agent, or Firm* — Amin, Turocy & Watson, LLP

(57) ABSTRACT

In an embodiment, a voice recognition apparatus includes: a program information storage unit; a dictionary storage unit; a calculating unit; an updating unit; a receiving unit; a recognizing unit; and an operation control unit. The program information storage unit stores metadata of a broadcast program with a user's viewing state. The dictionary storage unit stores a recognition dictionary including a recognition word and a priority of the recognition word. The calculating unit calculates a first score of a degree of the user's preference on a feature word based on the metadata and the viewing state. The updating unit updates the priority of the recognition word including the feature word according to the first score. The recognizing unit recognizes a voice using the recognition dictionary. The operation control unit controls an operation on the broadcast program based on a recognition result.

8 Claims, 10 Drawing Sheets

(56) References Cited

U.S. PATENT DOCUMENTS

2004/0083490 A1 4/2004 Hane
2004/0181391 A1* 9/2004 Inoue et al. .................. 704/10
2007/0150273 A1 6/2007 Yamamoto et al.

FOREIGN PATENT DOCUMENTS

| JP | 2002-142160 | 5/2002 |
| JP | 2006-094018 | 4/2006 |
| JP | 2007-178927 | 7/2007 |

* cited by examiner

FIG.2

| ID | DATE | TIME PERIOD | PROGRAM NAME | PERFORMER | KEYWORD | GENRE | VIEWING STATE |
|---|---|---|---|---|---|---|---|
| 1 | 3/28 | 20:00 TO 21:00 | PROGRAM A | MASAHARU FUKUMARU,... | LIVE BROADCAST, NEW SONG,... | MUSIC | VIEWED |
| 2 | 3/28 | 22:00 TO 23:00 | PROGRAM B | TOMOHISA YAMAMARU,... | DETECTIVE, SUSPENSE,... | DRAMA | VIEWED |
| 3 | 3/28 | 22:00 TO 23:00 | PROGRAM C | MARUKI AMAMI,... | EMOTIVE, HUMAN,... | DRAMA | NON-VIEWED |
| ... | ... | ... | ... | ... | ... | ... | ... |
| 101 | 4/1 | 19:00 TO 21:00 | PROGRAM X | MASAHARU FUKUMARU,... | LIVE BROADCAST, NEW SONG,... | MUSIC | NON-BROADCASTED |
| 102 | 4/1 | 21:00 TO 22:00 | PROGRAM Y | TOMOHISA YAMAMARU,... | DETECTIVE, SUSPENSE,... | DRAMA | NON-BROADCASTED |
| ... | ... | ... | ... | ... | ... | ... | ... |
| 110 | 4/3 | 21:00 TO 22:00 | PROGRAM Z | MARUKI AMAMI,... | SUSPENSE, SUPERNATURAL POWER,... | MOVIE | NON-BROADCASTED |
| ... | ... | ... | ... | ... | ... | ... | ... |

FIG.3

| ID | PROGRAM NAME | PROGRAM PREFERENCE SCORE |
|---|---|---|
| 101 | PROGRAM X | 0.82 |
| 102 | PROGRAM Y | 0.72 |
| ... | ... | ... |
| 110 | PROGRAM Z | 0.56 |

FIG.4

| PHONEME STRING | RECOGNITION WEIGHT |
|---|---|
| fukkumarumasaharu | 1.0 |
| sasupeNsu | 0.90 |
| ... | ... |
| baNgumiee | 0.0 |
| baNgumibii | 0.0 |
| ... | ... |

FIG.8

| FEATURE WORD ATTRIBUTE | FEATURE WORD |
|---|---|
| PERFORMER | MASAHARU FUKUMARU |
| PERFORMER | TOMOHISA YAMAMARU |
| ... | ... |
| KEYWORD | LIVE BROADCAST |
| KEYWORD | SUSPENSE |
| KEYWORD | DETECTIVE |
| ... | ... |
| GENRE | DRAMA |
| GENRE | MUSIC |
| ... | ... |
| | |

FIG.9

| REPEAT COUNT t | FEATURE WORD ATTRIBUTE | FEATURE WORD | FEATURE WORD PREFERENCE SCORE |
|---|---|---|---|
| 1 | PERFORMER | MASAHARU FUKUMARU | 0.92 |
| 2 | KEYWORD | SUSPENSE | 0.83 |
| 3 | GENRE | MUSIC | 0.70 |
| 4 | PERFORMER | TOMOHISA YAMAMARU | 0.65 |
| ... | ... | ... | ... |

FIG.14

| PHONEME STRING | RECOGNITION WEIGHT |
|---|---|
| fukkumarumasaharu | 0.0 |
| sasupeNsu | 0.0 |
| ... | ... |
| baNgumiee | 1.0 |
| baNgumibii | 0.88 |
| ... | ... |

FIG.15

START
↓
READ VOICE SIGNAL — S161
↓
EXTRACT FEATURE QUANTITY — S162
↓
CONVERT FEATURE QUANTITY TO PHONEME STRING — S163
↓
CONVERT PHONEME STRING TO WORD — S164
↓
OUTPUT RECOGNIZED WORD — S165
↓
END

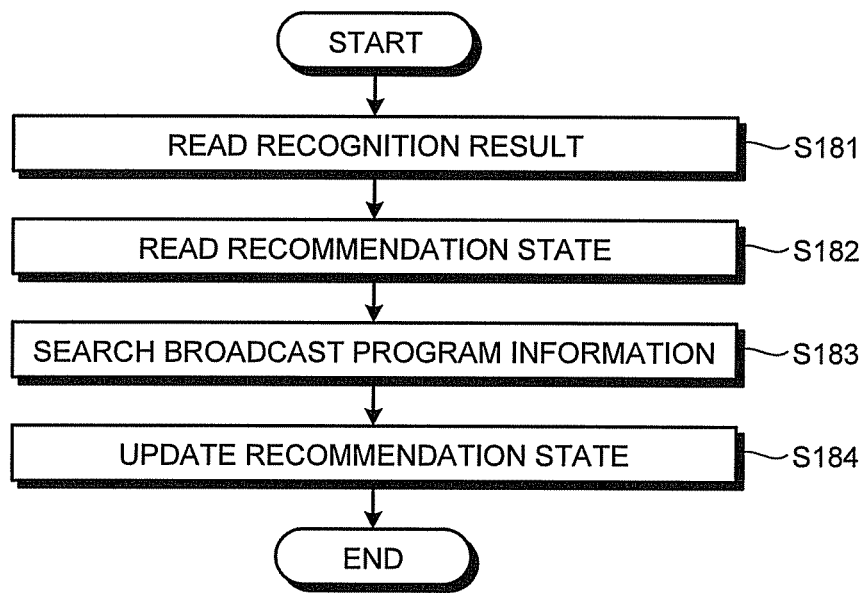
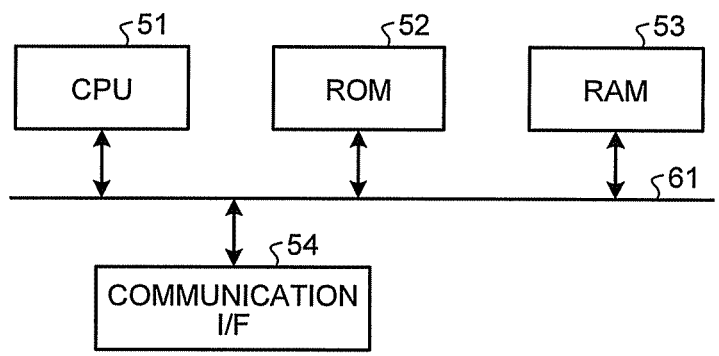

VOICE RECOGNITION APPARATUS, METHOD, AND COMPUTER PROGRAM PRODUCT

CROSS-REFERENCE TO RELATED APPLICATION(S)

This application is based upon and claims the benefit of priority from Japanese Patent Application No. 2011-207038, filed on Sep. 22, 2011; the entire contents of which are incorporated herein by reference.

FIELD

Embodiments described herein relate generally to a voice recognition apparatus, a voice recognition method, and a computer program product.

BACKGROUND

Techniques have been known that perform voice control using information of an electronic program guide (EPG) of broadcast programs. For example, a technique has been known that extracts words included in program names, performers, and keywords of broadcast programs from an EPG, sets the extracted words as recognition targets, and selects a corresponding broadcast program when a user's utterance corresponds to a certain word.

In the related art, a large amount of performers or keywords may be extracted from an EPG. Thus, since the vocabulary of voice recognition targets is so many, there is a problem in that erroneous recognition is likely to occur.

BRIEF DESCRIPTION OF THE DRAWINGS

FIG. 2 is a diagram illustrating an example of program information stored in a program information storage unit;

FIG. 3 is a diagram illustrating examples of a program name and a program preference score;

FIG. 4 is a diagram illustrating an example of a data structure of a recognition dictionary;

FIG. 8 is a diagram illustrating an example of a feature word;

FIG. 9 is a diagram illustrating an example of a preference model;

FIG. 14 is a diagram illustrating an example of a recognition dictionary when a recommendation state is 1;

FIG. 15 is a flowchart illustrating a voice recognizing process;

FIG. 16 is a flowchart illustrating an access control process; and

FIG. 17 is a diagram illustrating a hardware configuration of a voice recognition apparatus.

DETAILED DESCRIPTION

Figure 1:
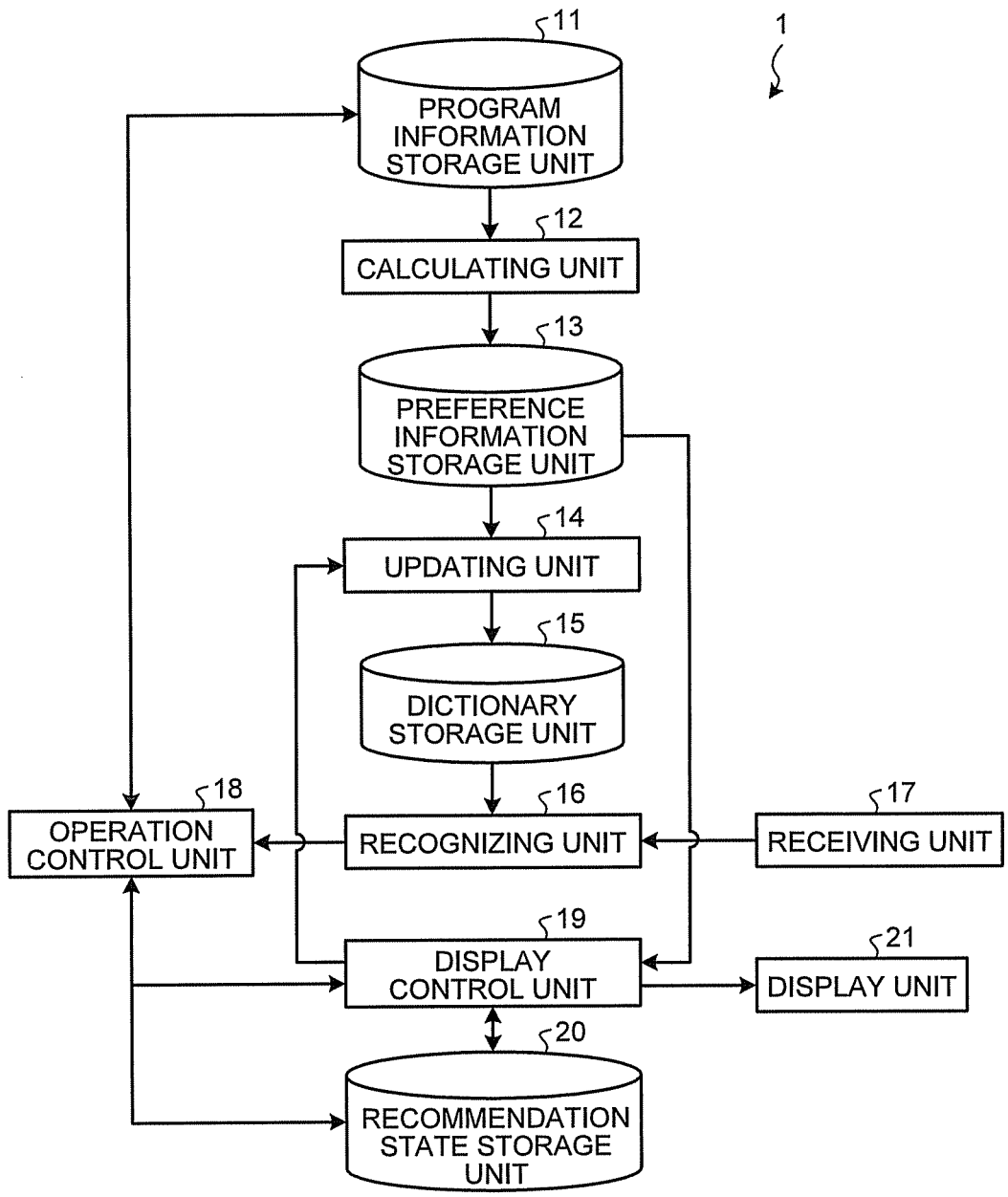
FIG. 1 is a block diagram illustrating a voice recognition apparatus according to the present embodiment.

In an embodiment, a voice recognition apparatus includes: a program information storage unit; a dictionary storage unit; a calculating unit; an updating unit; a receiving unit; a recognizing unit; and an operation control unit. The program information storage unit stores metadata of a broadcast program in association with a user's viewing state. The dictionary storage unit stores a recognition dictionary including a recognition word which is a voice recognition target and a priority of the recognition word. The calculating unit calculates a first score representing a degree of the user's preference on a feature word based on the metadata and the viewing state. The updating unit updates the priority of the recognition word including the feature word according to the first score. The receiving unit receives a voice. The recognizing unit recognizes the voice using the recognition dictionary. The operation control unit controls an operation on the broadcast program based on a recognition result by the recognizing unit.

Hereinafter, exemplary embodiments of a voice recognition apparatus according to the present invention will be described in detail with reference to the accompanying drawings. In the following, an example of implementing a voice recognition apparatus as a mechanism for viewing a broadcast program will be described, but an applicable apparatus is not limited to this example.

Devices for viewing broadcast programs have a problem in that the accuracy of voice recognition is not necessarily sufficient. For example, when a broadcast program is being viewed, sounds of the broadcast program are output from a speaker. For this reason, the output sounds make it difficult to recognize the user's utterance. Further, in many cases, viewing devices are installed in a living space, and various ambient noises may get mixed. For this reason, the accuracy of voice recognition is lowered by the viewing device. Thus, when many words extracted from the whole EPG are set as recognition targets as in the conventional art, the sufficient accuracy is unlikely to be obtained. Further, when voice-based control is performed, there is a problem in that the user has no information about words inputtable by a voice. In a method of setting words included in the EPG as recognition targets as in the conventional art, when the user has no information about content of the EPG, it is difficult for the user to know words used to select a program. For this reason, it is difficult for the user to know an utterance to select a desired program, and so it is difficult for the user to perform intended control.

In this regard, the voice recognition apparatus according to the present embodiment extracts a feature word which is a word representing a feature of a broadcast program based on metadata such as a genre or a performer assigned to a broadcast program and the user's viewing history (viewing state). Further, the feature word and a preference score representing a degree of the user's preference on a program are calculated, respectively. Then, recognition weights of the feature word and a program name are calculated based on the preference score, and then voice recognition is performed. The feature word or the program name which is high in the score is suggested to the user as an input candidate.

Since a recognition weight of voice recognition is calculated using the preference score; a feature word or a program name suiting the user's preference can be recognized with a high degree of accuracy. Further, since an input candidate is suggested based on the preference score, the user can be aware of the fact that a feature word or a program name suiting his/her preference can be input.

FIG. 1 is a block diagram illustrating an exemplary configuration of a voice recognition apparatus 1 according to the present embodiment. As illustrated in FIG. 1, the voice recognition apparatus 1 includes a program information storage unit 11, a calculating unit 12, a preference information storage unit 13, an updating unit 14, a dictionary storage unit 15, a recognizing unit 16, a receiving unit 17, an operation control unit 18, a display control unit 19, a recommendation state storage unit 20, and a display unit 21.

The program information storage unit 11 stores broadcast program information in which metadata of a broadcast program is associated with the user's viewing state. The metadata includes items such as an ID, a broadcast date and time, a program name (title), a performer, a keyword, and a genre. For example, the metadata can be easily extracted from a general EPG. A feature word is extracted from information of each item included in the metadata. Hereinafter, an each item in the metadata which is an extraction target of a feature word is referred to as a feature word attribute.

The viewing state represents the user's viewing state on the broadcast program. For example, the viewing state may be set to "viewed" when the user has viewed a program at a predetermined rate or more and may be set to "non-viewed" otherwise. Since information of a program which is scheduled to be broadcasted is also distributed through the EPG, for example, even information of a program after one week can be extracted. The viewing state of a program whose broadcast program information has been obtained but which is not broadcasted yet may be set to "non-broadcasted."

FIG. 2 is a diagram illustrating an example of the broadcast program information stored in the program information storage unit 11. Metadata such as an ID, a date, a time period, a program name, a performer, a keyword, and a genre are obtained on each program. A general EPG does not include a keyword. In this case, a keyword can be easily extracted from text describing an overview of a program using morphological analysis. In the present embodiment, the viewing states of programs A and B are set to "viewed," but the viewing state of a program C is set to "non-viewed." Further, in the present embodiment, programs X, Y, and Z have not been broadcasted yet, and the viewing states of the programs X, Y, and Z are set "non-broadcasted."

The calculating unit 12 calculates a feature word preference score representing a degree of the user's preference on the feature word using the broadcast program information, and learns a user preference model based on the feature word preference score. The calculating unit 12 calculates the program preference score representing a degree of the user's preference on the non-viewed broadcast program. The calculating unit 12 outputs preference information including a feature word, a feature word preference score, a program name, and a program preference score to the preference information storage unit 13.

The preference information storage unit 13 stores the output preference information. FIG. 3 is a diagram illustrating examples of the program name and the program preference score of the preference information. The preference information storage unit 13 similarly stores, for example, an ID, a feature word, and a feature word preference score in association with one another on the feature word and the feature word preference score.

The dictionary storage unit 15 stores a recognition dictionary used by voice recognition. For example, the dictionary storage unit 15 stores a recognition dictionary that includes a phoneme string of a recognition word as a voice recognition target and a recognition weight (priority) of a recognition word. FIG. 4 is a diagram illustrating an example of a data structure of the recognition dictionary. As illustrated in FIG. 4, the recognition dictionary includes a phoneme string and a recognition weight on the corresponding phoneme string. The data structure of the recognition dictionary of FIG. 4 is an example and not limited to this example.

The updating unit 14 updates the recognition weight of the recognition dictionary using the preference information stored in the preference information storage unit 13. For example, the updating unit 14 updates the recognition weight of the recognition word including the feature word corresponding to the feature word preference score such that the value of the recognition word increases as the feature word preference score increases. The updating unit 14 updates the recognition weight of the recognition word including the program name corresponding to the program preference score such that the value of the recognition weight increases as the program preference score increases.

The receiving unit 17 receives a voice uttered by the user and outputs a voice signal to the recognizing unit 16. For example, the receiving unit 17 may be implemented by a general microphone.

The recognizing unit 16 performs voice recognition using the voice signal input from the receiving unit 17 and the recognition dictionary stored in the dictionary storage unit 15, and outputs the recognition result to the operation control unit 18. The recognizing unit 16 preferentially executes voice recognition on a word having a high recognition weight.

The operation control unit 18 controls an access operation, such as a search of the broadcast program information stored in the program information storage unit 11 or recording reservation, using the recognition result output from the recognizing unit 16 and the recommendation state stored in the recommendation state storage unit 20.

The recommendation state storage unit 20 stores a recommendation state representing the type of information which the display control unit 19 recommends. For example, the recommendation state storage unit 20 stores two states such as a recommendation state 0 and a recommendation state 1. The recommendation state 0 represents a state in which information, related to a feature word having a high feature word preference score, is recommended based on the feature word preference score. The recommendation state 1 represents a state in which information, related to a program having a high program preference score, is recommended based on the program preference score. Here, it is assumed that the recommendation state storage unit 20 stores the recommendation state 0 as an initial value. The number of recommendation states is not limited to two, and three or more recommendation states may be used.

The display unit 21 includes a display device such as a liquid crystal display (LCD) for displaying a variety of information.

The display control unit 19 controls a display of information by the display unit 21. For example, the display control unit 19 suggests a word or a program name through the display unit 21 using the preference information stored in the preference information storage unit 13. For example, the display control unit 19 outputs the recommendation state designated by the user to the recommendation state storage unit 20. Further, when the recommendation state is updated by the user's designation, the display control unit 19 instructs the updating unit 14 to update the recognition weight according to the recommendation state.

The updating unit 14 selects either of whether to update the recognition weight of the recognition word including the feature word corresponding to the feature word preference score and whether to update the recognition weight of the recognition word including the program name corresponding to the program preference score, according to the recommendation state.

The storage units (the program information storage unit 11, the preference information storage unit 13, the dictionary storage unit 15, and the recommendation state storage unit 20) may be configured with a usually used storage medium such as an HDD (hard disk drive), an optical disk, a memory card, and RAM (random access memory).

Figure 5:
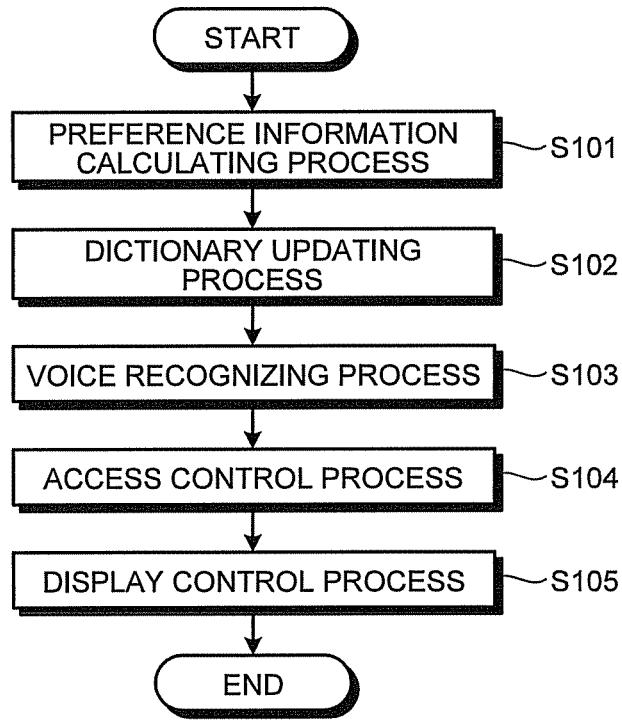
FIG. 5 is a flowchart illustrating a voice recognizing process.

Next, a voice recognizing process performed by the voice recognition apparatus 1 having the above-described configuration according to the present embodiment will be described with reference to FIG. 5. FIG. 5 is a flowchart illustrating the flow of an overall voice recognizing process according to the present embodiment.

First, the calculating unit 12 executes a preference information calculating process of calculating the preference information using the broadcast program information and calculating the user preference model (step S101). Next, the updating unit 14 executes a dictionary updating process of updating the recognition dictionary using the preference information (step S102). Next, the recognizing unit 16 executes a voice recognizing process of recognizing a received voice (step S103). Next, the operation control unit 18 executes various access control processes on the broadcast program according to the recognition result of the voice recognizing process (step S104). The display control unit 19 executes a display control process of displaying a result of the access control process or the like on the display unit 21 as necessary (step S105).

Figure 6:
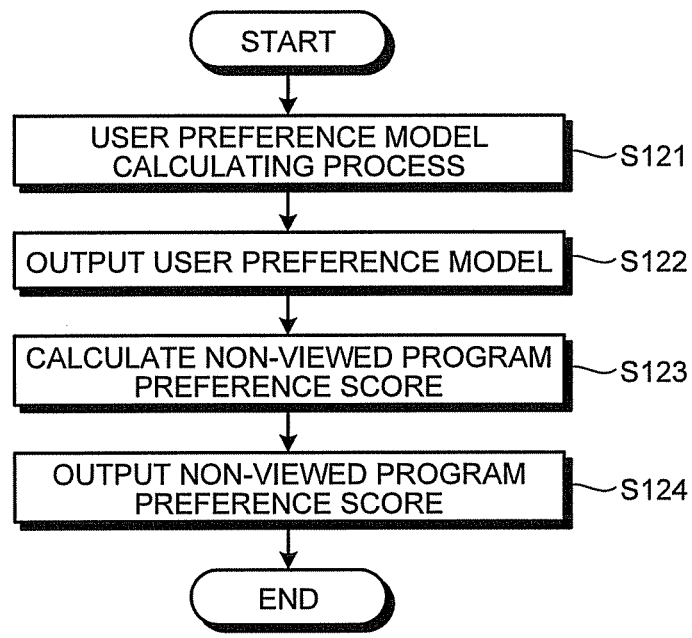
FIG. 6 is a flowchart illustrating a preference information calculating process.

Next, the details of each step of FIG. 5 will be described below. FIG. 6 is a flowchart illustrating an example of the preference information calculating process of step S101.

The calculating unit 12 executes a preference model calculating process of calculating the user preference model using the broadcast program information including the user's viewing state (step S121).

Figure 7:
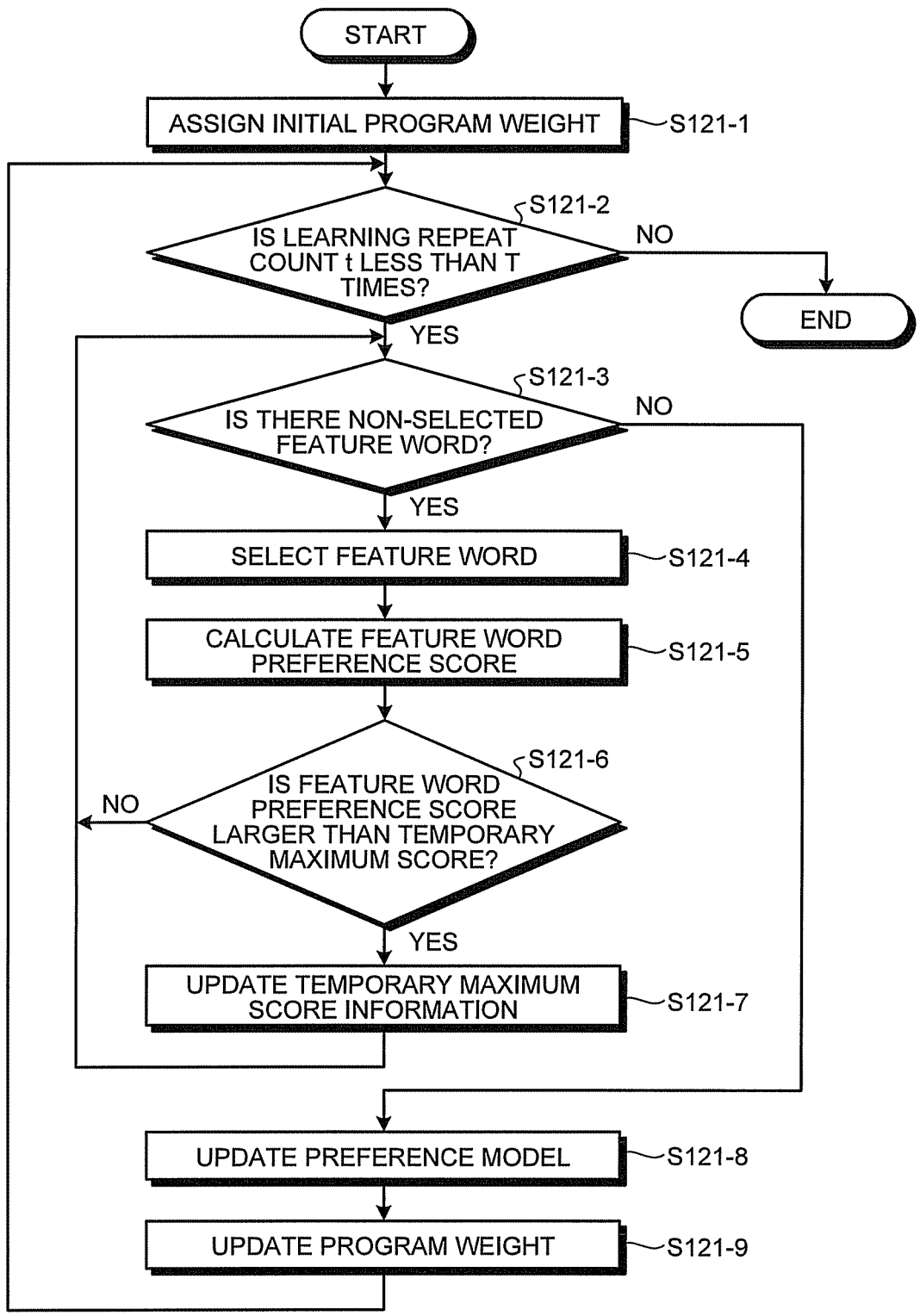
FIG. 7 is a flowchart illustrating a preference model calculating process.

FIG. 7 is a flowchart illustrating an example of the preference model calculating process of step S121. The preference model calculating process is based on a boosting technique. The boosting technique has a feature of introducing a data weight and performing learning while sequentially updating the data weight. The boosting technique is known to show a high classification performance.

First, the calculating unit 12 assigns an initial program weight to an already broadcasted broadcast program (step S121-1). The following Equation (1) represents an example of an initial program weight $w_i^0$ of a broadcast program. Here, $w_i^t$ represents a weight (program weight) of a broadcast program i when a repeat count is t.

$$w_i^0 = 1/N_p, i=1,2,\ldots,N_p \quad (1)$$

Here, i represents an ID of a broadcast program, and the number of already broadcasted broadcast programs is assumed to be $N_p$. Equation (1) represents that an equal program weight of $1/N_p$ is assigned to all of broadcast programs from i=1 to i=$N_p$. The number $N_p$ depends on a storage amount of information of programs which have been broadcasted in the past. For example, it is known that about 2,000 broadcast programs are generally broadcasted through 7 terrestrial channels during a week. In the present embodiment, it is assumed that information of broadcast program corresponding to the past one week is stored.

Next, the calculating unit 12 determines whether or not the calculation (learning) repeat count t is less than a predetermined upper limit count T (step S121-2). When the repeat count t is equal to T (No in step S121-2), the preference model calculating process ends.

When t is less than T (Yes in step S121-2), the calculating unit 12 determines whether or not there is a non-selected feature word among feature words included in the metadata (step S121-3).

FIG. 8 is a diagram illustrating an example of a feature word according to the present embodiment. FIG. 8 represents an example of a set in which a feature word attribute is associated with a feature word extracted from metadata of the feature word attribute. For example, a set of (performer, masaharu fukumaru), (keyword, live broadcast), and (genre, music) is obtained from the broadcast program information corresponding to the program A of FIG. 2. The calculating unit 12 sequentially selects the non-selected feature word from the feature words obtained in the above-described way.

Returning to FIG. 7, when there is a non-selected feature word (Yes in step S121-3), the calculating unit 12 selects one from among the non-selected feature words (step S121-4). The calculating unit 12 calculates a feature word preference score on the selected feature word (step S121-5). The following Equation (2) represents an example of a formula of calculating a feature word preference score $f_i$.

$$f_i = \sum_{i=1}^{N_p} w_i^t \times I(i)/N_p \quad (2)$$

Here, I(i) represents a function which becomes 1 (one) when the user has viewed the broadcast program i and 0 (zero) otherwise. The feature word preference score of Equation (2) is added in a form in which a program weight is reflected. As will be described later, for example, the program weight is updated to increase a value of a program viewed by the user. For this reason, the feature word included in the broadcast program having the high program weight by viewing of the user has a high feature word preference score value.

Next, the calculating unit 12 determines whether or not the feature word preference score is larger than the feature word preference score included in temporary maximum score information (step S121-6). In the present embodiment, it is assumed that an initial value of the feature word preference score included in the temporary maximum score information is 0 (zero). Equation (3) represents an example of the temporary maximum score information in the present embodiment. In the example of Equation (3), the temporary maximum score information is configured with a set of the feature word attribute, the feature word, and the feature word preference score.

$$(\text{Performer, Masaharu Fukumaru}, 0.92) \quad (3)$$

When the feature word preference score is larger than the feature word preference score included in temporary maximum score information (Yes in step S121-6), the calculating unit 12 updates the temporary maximum score information using the selected feature word attribute, the feature word, and the feature word preference score (step S121-7). For example, the temporary maximum score information is stored in a storage unit (not illustrated) such as RAM.

After the temporary maximum score information is updated or when the feature word preference score is equal to or less than the feature word preference score included in the temporary maximum score information (No in step S121-6), the process returns to step S121-3 and is repeated.

When there is no non-selected feature word (No in step S121-3), the calculating unit 12 updates a preference model by storing the temporary maximum score information (step S121-8), and initializes the temporary maximum score information.

FIG. 9 is a diagram illustrating an example of a preference model. The preference model includes the repeat count t, the feature word attribute included in the temporary maximum score information, the feature word, and the feature word preference score. In FIG. 9, (performer, masaharu fukumaru, 0.92) is stored as the preference model by a first repeat calculation, and (keyword, suspense, 0.83) is stored as the preference model by a second repeat calculation.

Returning to FIG. 7, the calculating unit 12 calculates the program weight on the already broadcasted broadcast program (step S121-9). After the calculation, the process returns to step S121-2 and is repeated. Equation (4) represents an example of a formula of updating the program weight of the broadcast program.

$$w_i^t = w_i^{t-1} \times \exp[f_{t-1} \times y_i \times h_{t-1}(x)] \quad (4)$$

Here, $f_{t-1}$ represents the feature word preference score of a (t−1)-th repeat calculation stored in the preference model, and x represents the feature word. $y_i$ represents a variable number which becomes 1 (one) when the user has viewed the broadcast program i and −1 otherwise. $h_{t-1}(x)$ represents a function which becomes 1 (one) when the feature word x is included in the metadata of the broadcast program i and becomes −1 otherwise.

By updating the program weight based on Equation (4), the program weight of the program which includes the feature word with the high feature word preference score but has not been viewed yet or the program weight of the program which does not include the feature word with the high feature word preference score but has been viewed increases. The update of the program weight is used by the boosting technique, and so learning of the preference model can be performed with a high degree of accuracy.

The upper limit count T of the repeat calculation may be set to an arbitrary value. In the present embodiment, it is assumed that a value of T is set to 1,000.

Returning to FIG. 6, the process after the preference model calculating process will be continuously described. The calculating unit 12 outputs the user preference model obtained by the preference model calculating process to the preference information storage unit 13 (step S122).

FIG. 9 is a diagram illustrating an example of the user preference model. Since the upper limit count T of the repeat calculation is 1,000, the user preference model including 1,000 feature words and 1,000 feature word preference scores is stored in the preference information storage unit 13.

Next, the calculating unit 12 calculates the program preference score of the non-broadcasted broadcast program based on the user preference model (step S123). Equation (5) represents an example of a formula of calculating a program preference score $fs_j$ of a non-broadcasted broadcast program j.

$$fs_j = \sum_{t=1}^{T} f_t \times h_t(x) \bigg/ \sum_{t=1}^{T} f_t \quad (5)$$

Here, j represents an ID unique to a non-broadcasted broadcast program. $f_t$ represents a value of a t-th feature word preference score of the preference model. $x_t$ represents a t-th feature word of the preference model. $h_t(x)$ represents a function which becomes 1 (one) when the feature word x is included in the metadata of the broadcast program j and becomes −1 otherwise. In Equation (5), the broadcast program including many feature words with the high feature word preference score is high in the program preference score.

Next, the calculating unit 12 outputs the program preference score of the non-broadcasted broadcast program to the preference information storage unit 13 (step S124). FIG. 3 illustrates examples of the program preference scores of the non-broadcasted programs X, Y, and Z calculated in the above-described way. In the example of FIG. 3, among the non-broadcasted programs X, Y, and Z of FIG. 2, the programs X and Y including the feature words with the high feature word preference score are high in the program preference score.

Figure 10:
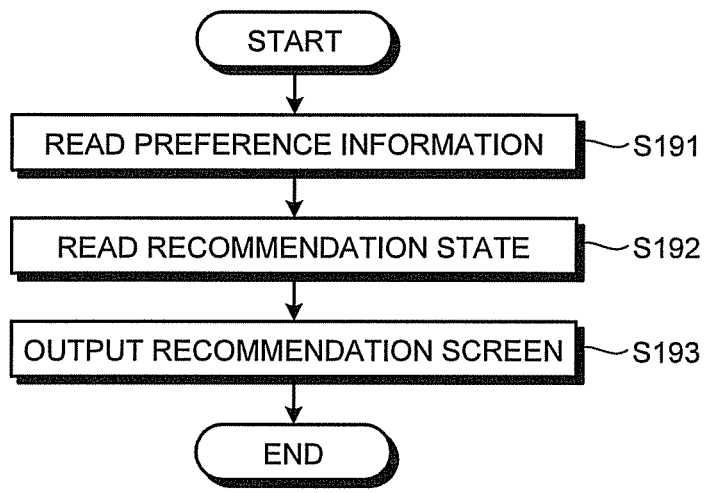
FIG. 10 is a flowchart illustrating a display control process.

FIG. 10 is a flowchart illustrating an example of the display control process of step S105.

The display control unit 19 reads the preference information stored in the preference information storage unit 13 (step S191). The display control unit 19 reads the recommendation state from the recommendation state storage unit 20 (step S192). The display control unit 19 displays a recommendation screen corresponding to the read recommendation state on the display unit 21 that allows the user to perform actual viewing (step S193).

Figure 11:
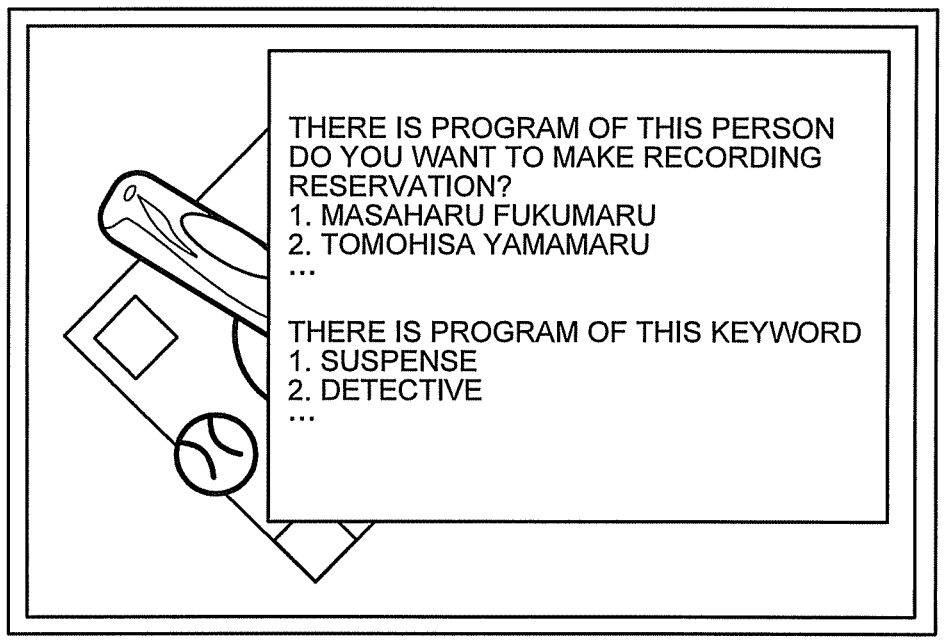
FIG. 11 is a diagram illustrating a recommendation screen when a recommendation state is 0.

FIG. 11 is a diagram illustrating an example of a recommendation screen output by the display control unit 19 when the recommendation state is 0 (zero). The display control unit 19 displays K feature words (K is a predetermined integer of 1 or more) in order of the feature word preference score when the recommendation state is 0 (zero). The display control unit 19 displays the feature words for each feature word attribute such as a performer or a genre.

Figure 12:
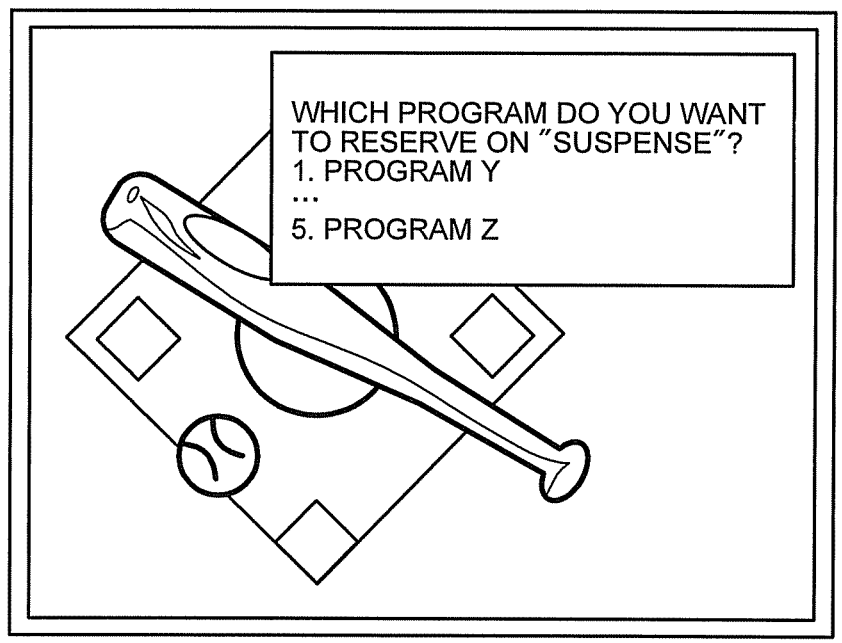
FIG. 12 is a diagram illustrating a recommendation screen when a recommendation state is 1.

FIG. 12 is a diagram illustrating an example of a recommendations screen output by the display control unit 19 when the recommendation state is 1 (one). In the example of FIG. 12, programs are displayed in order of the non-viewed program preference score. When the display control unit 19 displays the feature word or the program name on the screen, the user can recognize an inputtable word, and a word uttered by the user at the time of utterance can be easily decided.

Figure 13:
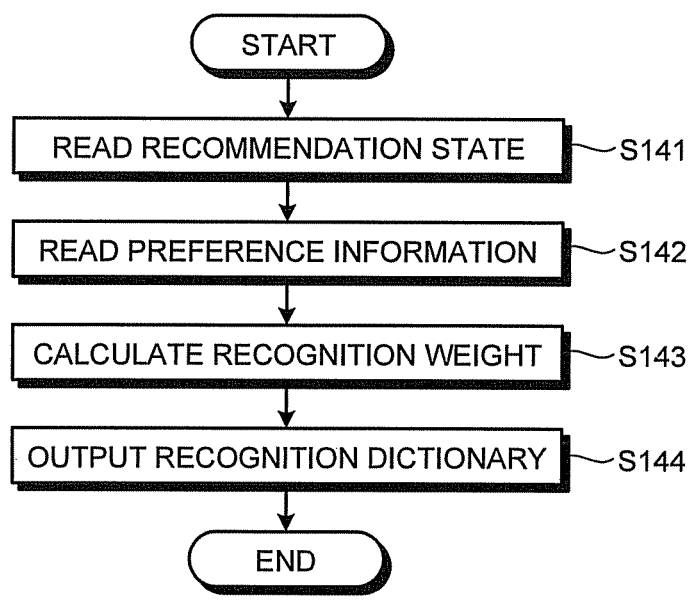
FIG. 13 is a flowchart illustrating a dictionary updating process.

FIG. 13 is a flowchart illustrating an example of the dictionary updating process of step S102.

The updating unit 14 reads the recommendation state from the recommendation state storage unit 20 (step S141). The updating unit 14 reads the preference information stored in the preference information storage unit 13 (step S142). The updating unit 14 converts the feature word and the program name into the phoneme string, and calculates the recognition weight of each converted phoneme string based on the recommendation state and the preference information (step S143).

Equation (6) represents the recognition weight when the recommendation state is 0 (zero). In Equation (6), the recognition weight has a value between 0 and 1 on a feature word $x_i$ and a value of 0.0 on a program name $p_j$. $fav(x_i)$ represents the feature word preference score of the feature word $x_i$. $max(fav(x))$ represents a maximum value of the feature word preference score.

$$rw(x_i) = fav(x_i)/max(fav(x))$$

$$rw(p_j) = 0 \quad (6)$$

FIG. 4 described above illustrates an example of the recognition dictionary when the recommendation state is 0 (zero). In the phoneme string, "masaharu fukumaru" and "suspense," which are feature words and "program A" and "program" which are program names are converted into phoneme strings "fukumarumasaharu," "sasupeNsu," "baNgumiee," and "baNgumibii," respectively. Conversion from a character string of a feature word or a program name to a phoneme string can be easily implemented using the morphological analysis.

In the recognition weight, a value of the recognition weight calculated by Equation (6) is stored. In the voice recognition, a word having a high recognition weight is preferentially recognized. In the present embodiment, the recommendation state 0 represents a state in which a feature word is a recommended on a screen. For this reason, by setting the recognition weight of the program name to 0.0, it is possible to prevent a feature word from being erroneously recognized as a program name.

Equation (7) represents the recognition weight when the recommendation state is 1 (one). In Equation (7), the recognition weight has a value of 0.0 on the feature word $x_i$ and a value between 0 and 1 on the program name $p_j$.

$$rw(x_i)=0$$

$$rw(p_j)=\text{fav}(x_i)/\max(\text{fav}(x)) \qquad 7)$$

FIG. 14 is a diagram illustrating an example of a recognition dictionary when the recommendation state is 1 (one). In the present embodiment, the recommendation state 1 represents a state in which a program name is recommended on a screen. For this reason, by setting the recognition weight of the feature word to 0.0, it is possible to prevent a program name from being erroneously recognized as a feature word.

Returning to FIG. 13, the updating unit 14 outputs the recognition dictionary in which the recognition weight is updated to the dictionary storage unit 15 (step S144). As described above, the updating unit 14 assigns the high recognition weight to the feature word or the program name suiting the user's preference, and thus a word predicted to be uttered by the user can be recognized with a high degree of accuracy.

FIG. 15 is a flowchart illustrating an example of the voice recognizing process of step S103.

The recognizing unit 16 reads the voice signal through the receiving unit 17 (step S161). The recognizing unit 16 extracts a feature quantity used for voice recognition from a voice signal (step S162). General feature quantity extraction can be easily implemented using a known technique. For example, a spectrum feature quantity string may be obtained by calculating an MFCC (Mel-Frequency-Cepstrum-Coefficient) in units of frames which are delimited at regular intervals.

The recognizing unit 16 converts the extracted feature quantity into a phoneme string (step S163). General phoneme string conversion can be easily implemented using a known technique. For example, a spectrum feature quantity string may be converted into a phoneme string by conversion using a hidden Markov model.

The recognizing unit 16 converts the phoneme string into a word (step S164). When the phoneme string is converted into a word, the recognition weight is reflected. Since the user is likely to utter a word suiting his/her preference, the phoneme string is preferentially converted to a word having a high recognition weight. Thus, even when erroneous recognition is caused by phoneme string conversion, robust word recognition can be performed. The recognizing unit 16 outputs the recognized word to the operation control unit 18 (step S165).

FIG. 16 is a flowchart illustrating an example of the access control process of step S104.

The operation control unit 18 reads a recognition result from the recognizing unit 16 (step S181). The operation control unit 18 reads the recommendation state from the recommendation state storage unit 20 (step S182). The operation control unit 18 searches for the broadcast program information stored in the program information storage unit 11 (step S183). When the recommendation state is 0 (zero), the operation control unit 18 outputs a program in which the recognition result is included as a feature word of a broadcast program to the display control unit 19 as a search result. When the recommendation state is 1 (one), the operation control unit 18 makes a recording reservation of a program in which the recognition result matches the program name.

The operation control unit 18 updates the recommendation state and then outputs the updated recommendation state to the recommendation state storage unit 20 (step S184). When the recommendation state is 0 (zero), the operation control unit 18 updates the recommendation state to 1 (one), and then outputs 1 (one) to the recommendation state storage unit 20. However, when the recommendation state is 1 (one), the operation control unit 18 updates the recommendation state to 0 (zero), and then outputs 0 (zero) to the recommendation state storage unit 20.

FIGS. 11 and 12 described above illustrate examples of effects of the present embodiment. According to the present embodiment, the voice recognition apparatus 1 can suggest a keyword which can be recognized by voice recognition at an appropriate timing as illustrated in FIG. 11. For example, a timing directly after a program ends may be considered as the appropriate timing. The suggested keyword is weighted based on the recognition weight. For this reason, a word having a high probability that the user will utter can be recognized with a high degree of accuracy. In other words, a keyword can be input without a cumbersome operation by a remote controller or a keyboard. In the following, it is assumed that the user utters "suspense" toward the system.

When a keyword is recognized, the voice recognition apparatus 1 updates the recommendation state, and displays a search result as illustrated in FIG. 12. In FIG. 12, programs including broadcast programs in which "suspense" is included as a feature word are suggested. As described above, according to the voice recognition apparatus 1 of the present embodiment, a desired keyword is selected from among keywords suiting the user's preference, a broadcast program is narrowed down based on the selected keyword, and individual broadcast programs corresponding to the keyword can be displayed.

Since "suspense" is a generally-used word, many non-broadcasted programs are considered to include "suspense" as a feature word. When many broadcast programs are searched, a screen display may become cumbersome, and a new operation such as a screen scroll operation for searching a desired program may be necessary. For this reason, in the present embodiment, the program Y that suits the user's preference is displayed in an upper portion, and the program Z that does not suit the user's preference is displayed in a lower portion. Since the programs suiting the user's preference are simply displayed on the screen, the user can intuitively perform viewing or a recording reservation of a program by a voice, and can simply perform an intended operation on a desired program.

The voice recognition apparatus 1 may be used by a plurality of users. Thus, the above process may be performed for each user. In this case, for example, the storage units (the program information storage unit 11, the preference information storage unit 13, the dictionary storage unit 15, and the recommendation state storage unit 20) may be configured to store each information for each user.

For example, for user determination, the recognizing unit 16 may be configured to include a voice-based speaker determining function. Specifically, for example, the recognizing unit 16 may be configured to include a speaker determining function of analyzing an acoustic feature quantity such as a basic frequency, a spectrum distribution, a formant distribution, or an utterance speed of a voice received by the receiving unit 17. The speaker determining function is not limited to this example. For example, information (e.g., user ID) specifying the user may be input in advance by an operation input unit (not illustrated) such as a remote controller, and the user may be determined based on this information.

As described above, according to the present embodiment, the user can easily view a desired program or make a recording reservation of a desired program.

Next, a hardware configuration of the voice recognition apparatus according to the present embodiment will be described with reference to FIG. 17. FIG. 17 is an explanatory view illustrating a hardware configuration of the voice recognition apparatus according to the present embodiment.

The voice recognition apparatus according to the present embodiment includes a control device such as a CPU (central processing unit) 51, a storage device such as ROM (read only memory) 52 or RAM (random access memory) 53, a communication interface (I/F) 54 that is connected to a network and performs communication, and a bus 61 that connects components to each other.

A program executed by the voice recognition apparatus according to the present embodiment is embedded in the ROM 52 or the like in advance and the provided.

The program executed by the voice recognition apparatus according to the present embodiment is a file of an installable format or an executable format. The program may be recorded in a computer readable recording medium such as a CD-ROM (compact disk read only memory), a flexible disk (FD), a CD-R (compact disk recordable), and a DVD (digital versatile disk) and provided as a computer program product.

In addition, the program executed by the voice recognition apparatus according to the present embodiment may be stored in a computer connected to a network such as the Internet and provided by downloading via the network. The program executed by the voice recognition apparatus according to the present embodiment may be provided or distributed via the network such as the Internet.

The program executed by the voice recognition apparatus according to the present embodiment causes a computer to function as components of the voice recognition apparatus (the calculating unit, the updating unit, the recognizing unit, receiving unit, the operation control unit, and the display control unit). The computer may read the program from a computer readable storage medium to a main storage device and execute the program through the CPU 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice recognition apparatus comprising:
a program information storage unit configured to store metadata of a broadcast program in association with a user's viewing state;
a dictionary storage unit configured to store a recognition dictionary including a recognition word which is a voice recognition target and a priority of the recognition word;
a recommendation state storage unit configured to store a recommendation state representing one of a first state and a second state, the first state representing a state in which a feature word having a high first score is recommended among feature words, each feature word representing a feature of the broadcast program, the first score representing a degree of the user's preference for a feature word, the second state representing a state in which a feature word including specific information is recommended among the feature words, the specific information specifying a broadcast program having a high second score, the second score representing a degree of the user's preference for the broadcast program;
a calculating unit configured to calculate the first score, the second score, and the feature words on the basis of the metadata and the viewing state;
an updating unit configured to update the priority of a recognition word including a feature word among the feature words according to the first score when the recommendation state indicates the first state and to update the priority of a recognition word including the specific information according to the second score when the recommendation state indicates the second state;
a receiving unit configured to receive a voice;
a recognizing unit configured to recognize the voice using the recognition dictionary; and
an operation control unit configured to control an operation on the broadcast program based on a recognition result by the recognizing unit.

2. The apparatus according to claim 1, further comprising a display control unit configured to preferentially select a feature word that has a high first score as an input candidate representing a candidate of an input indicating the operation, and causes the selected input candidate to be displayed on a display unit.

3. The apparatus according to claim 2,
wherein
the display control unit
preferentially selects a feature word that has a high first score as the input candidate when selection is designated based on the first score,
preferentially selects the feature word that includes the specific information specifying the broadcast program having the high second score as the input candidate when selection is designated based on the second score, and
causes the selected input candidate to be displayed on the display unit.

4. The apparatus according to claim 1,
wherein
the updating unit
updates the priority of the recognition word including the feature word according to the first score when update is designated based on the first score, and
updates the priority of the recognition word including the specific information according to the second score when update is designated based on the second score.

5. The apparatus according to claim 1,
wherein the calculating unit calculates the first score such that a value on a feature word included in the broadcast program viewed by the user is higher than a value on a feature word included in the broadcast program not viewed by the user.

6. The apparatus according to claim 1,
wherein
the program information storage unit stores the metadata in association with the viewing state for each of a plurality of the users,
the dictionary storage unit stores the recognition dictionary for each of the plurality of the users,
the calculating unit calculates the feature word and the first score based on the metadata and the user's viewing state for each of the plurality of the users, and
the recognizing unit further determines the user who has uttered the voice based on the received voice, and recognizes the voice using the recognition dictionary of the determined user.

7. A voice recognition method executed in a voice recognition apparatus that includes a program information storage unit that stores metadata of a broadcast program in association with a user's viewing state, a dictionary storage unit that stores a recognition dictionary including a recognition word which is a voice recognition target and a priority of the recognition word, and a recommendation state storage unit that stores a recommendation state representing one of a first state and a second state, the first state representing a state in which a feature word having a high first score is recommended among feature words, each feature word representing a feature of the broadcast program, the first score representing a degree of the user's preference for a feature word, the second state representing a state in which a feature word including specific information is recommended among the feature words, the specific information specifying a broadcast program having a high second score, the second score representing a degree of the user's preference for the broadcast program, the method comprising:
   calculating the first score, the second score, and the feature words on the basis of the metadata and the viewing state;
   updating the priority of a recognition word including a feature word among the feature words according to the first score when the recommendation state indicates the first state and updating the priority of a recognition word including the specific information according to the second score when the recommendation state indicates the second state;
   receiving a voice;
   recognizing the voice using the recognition dictionary; and
   controlling an operation on the broadcast program based on a recognition result at the recognizing of the voice.

8. A computer program product comprising a non-transitory computer-readable medium including programmed instructions for voice recognition method executed in a voice recognition apparatus that includes a program information storage unit configured to store metadata of a broadcast program in association with a user's viewing state, a dictionary storage unit configured to store a recognition dictionary including a recognition word which is a voice recognition target and a priority of the recognition word, and a recommendation state storage unit configured to store a recommendation state representing one of a first state and a second state, the first state representing a state in which a feature word having a high first score is recommended among feature words, each feature word representing a feature of the broadcast program, the first score representing a degree of the user's preference for a feature word, the second state representing a state in which a feature word including specific information is recommended among the feature words, the specific information specifying a broadcast program having a high second score, the second score representing a degree of the user's preference for the broadcast program, wherein the instructions, when executed by a computer, cause the computer to perform:
   calculating the first score, the second score, and the feature words based on the metadata and the viewing state;
   updating the priority of a recognition word including a feature word among the feature words according to the first score when the recommendation state indicates the first state and updating the priority of a recognition word including the specific information according to the second score when the recommendation state indicates the second state;
   receiving a voice;
   recognizing the voice using the recognition dictionary; and
   controlling an operation on the broadcast program based on a recognition result at the recognizing of the voice.

* * * * *